(12) United States Patent
Liu

(10) Patent No.: US 7,357,677 B2
(45) Date of Patent: Apr. 15, 2008

(54) MICRO SD ADAPTER STRUCTURE

(75) Inventor: Shih-Tung Liu, Gongguan Township, Miaoli County (TW)

(73) Assignee: Sun-Light Electronic Technologies Inc., Miaoli County (TW)

( * ) Notice: Subject to any disclaimer, the term of this patent is extended or adjusted under 35 U.S.C. 154(b) by 0 days.

(21) Appl. No.: 11/500,950

(22) Filed: Aug. 9, 2006

(65) Prior Publication Data

US 2008/0038960 A1   Feb. 14, 2008

(51) Int. Cl.
*H01R 24/00* (2006.01)
(52) U.S. Cl. .................... 439/630; 439/159
(58) Field of Classification Search ............ 439/630, 439/159, 638, 945, 325–328, 629, 946, 66
See application file for complete search history.

(56) References Cited

U.S. PATENT DOCUMENTS 6,042,411 A * 3/2000 Choy .................... 439/328
6,520,779 B1 * 2/2003 Watanabe et al. .......... 439/66
7,172,464 B1 * 2/2007 Lee ........................ 439/630
2006/0166559 A1 * 7/2006 Nakai et al. .............. 439/630
2007/0111604 A1 * 5/2007 Ying et al. ............... 439/630

* cited by examiner

*Primary Examiner*—Edwin A. Leon
(74) *Attorney, Agent, or Firm*—Muncy, Geissler, Olds & Lowe, PLLC

(57) ABSTRACT

A micro SD adapter structure includes a casing having an insert slot, a hollow portion at the casing, an embedding groove at the hollow portion, a plurality of sunken grooves corresponding to the hollow portion, a connecting base proximate to each sunken groove; a transmitting interface at the hollow portion and having a plurality of contact portions, a terminal module at the embedding groove and having a fixing base, a plurality of terminals on the fixing base, and an end of each terminal electrically coupled to each contact portion on a surface of the connecting interface and another end corresponding to the plurality of sunken grooves; and a latch unit on the connecting base. The micro SD card can be secured into the insert slot to achieve a better electric transmitting effect and swap the micro SD card immediately when the micro SD card is inserted into the insert slot.

6 Claims, 7 Drawing Sheets

MICRO SD ADAPTER STRUCTURE

FIELD OF THE INVENTION

The present invention relates to a micro SD adapter structure, and more particularly to an adapter structure capable of installing a micro SD card securely into an insert slot of a casing, so that the micro SD card will not be loosened or fallen out easily and a better electric transmission can be achieved. Further, the micro SD card can be swapped immediately when the micro SD card is installed into the casing of the micro SD adapter.

BACKGROUND OF THE INVENTION

Referring to FIGS. 1 and 2 for a prior art micro SD adapter 7, the micro SD adapter 7 comprises an upper casing 71 and a lower casing 72 engaged with each other to form a hollow structure in the shape of a mini SD card; an insert slot 73 disposed at a side of the adapter 7, a hollow portion 74 disposed at an end of the lower casing 72, a transmitting unit 8 disposed on the hollow portion 74, an goldfinger interface 81 installed at the transmitting unit 8, a fixing portion 82 integrally extended from the goldfinger interface 81 and having a plurality of terminals 83 coupled in a direction towards the opening of the insert slot 73, such that the micro SD card (not shown in the figure) can be inserted into the insert slot 73 at a lateral side of the adapter 7, and each terminal 83 is in contact with the goldfinger at the bottom surface of the micro SD card, so as to achieve an electric transmitting effect.

Although the prior art micro SD adapter 7 can install a micro SD card for achieving the electric transmitting effect, yet the terminals 83 are in a planar form, such that when the terminals 83 are in contact with the goldfingers at the bottom surface of the micro SD card, the terminals 83 becomes less resilient and have no other latching mechanism. As a result, the inserted micro SD card may be loosened or fallen out easily and cannot be inserted securely into the insert slot 73 of the micro SD adapter 7, and the electric transmission may become less efficient.

Since the micro SD card is inserted into a lateral side of the adapter 7, therefore when the adapter 7 is inserted into the card reader, a portion or the whole of the micro SD card in the insert slot 73 is limited to the internal side of a wall of the insert slot of the card reader. Therefore, if a user wants to change the micro SD card while using the micro SD card, the user needs to take the adapter 7 out from the insert slot of the card reader and then remove the micro SD card from the adapter 7 for a swap, and such arrangement causes tremendous inconvenience to users.

SUMMARY OF THE INVENTION

Therefore, it is a primary objective of the present invention to install a micro SD card securely into an insert slot of a casing by a plurality of terminals installed into a sunken groove disposed in the casing and a latch unit, such that the micro SD card will not loosened or fallen out easily to achieve a better electric transmitting effect. The invention also can use an insert slot disposed at a distal edge of the casing to swap the micro SD card when the micro SD card is inserted in the casing of the micro SD card adapter.

To achieve the foregoing objective, a micro SD adapter structure of the invention comprises a casing having an insert slot which is a hollow structure in the shape of a mini SD card, a hollow portion disposed on a surface of the casing, an embedding groove disposed on a corresponding surface of the hollow portion, a plurality of fixing grooves disposed on a lateral side of the hollow portion, a connecting base disposed at a lateral side proximate to each sunken groove; a transmitting interface having a plurality of contact portions disposed on both surfaces of the transmitting interface and disposed at the hollow portion; a terminal module having a fixing base and disposed in the embedding groove, and the fixing base includes a plurality of terminals, and each terminal is electrically coupled to each contact portion of a surface of the transmitting interface, and another end is corresponding to a plurality of sunken grooves, and a latch unit disposed on the connecting base.

DETAILED DESCRIPTION OF THE PREFERRED EMBODIMENTS

Figure 1:
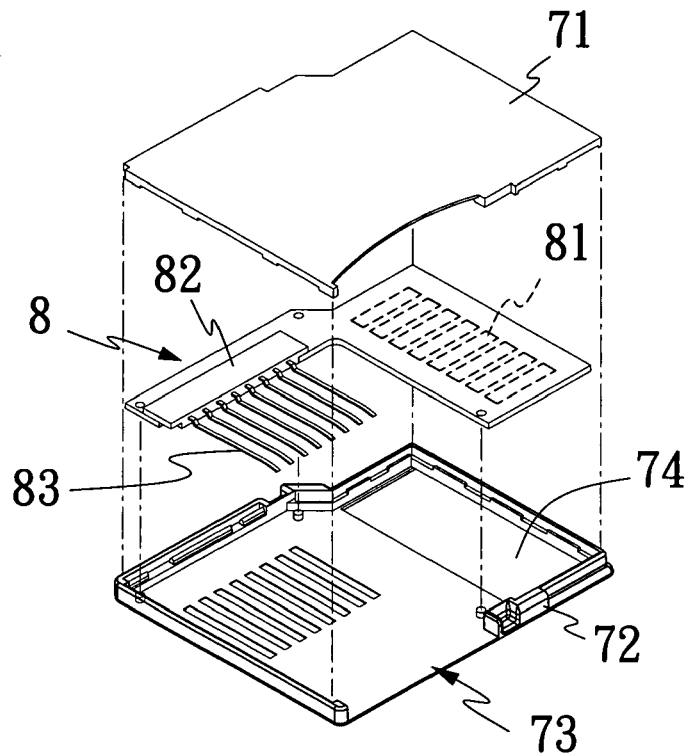
FIG. 1 is an exploded view of a prior art micro SD adapter.
Figure 2:
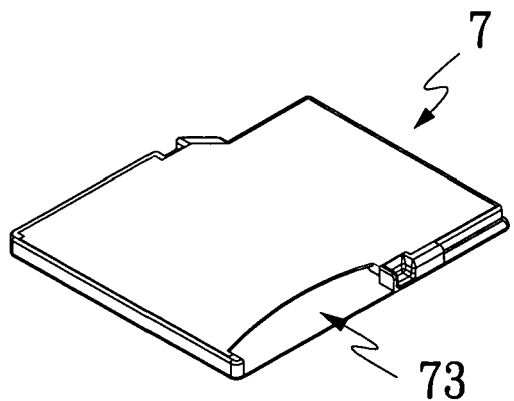
FIG. 2 is a perspective view of a prior art micro SD adapter.
Figure 3:
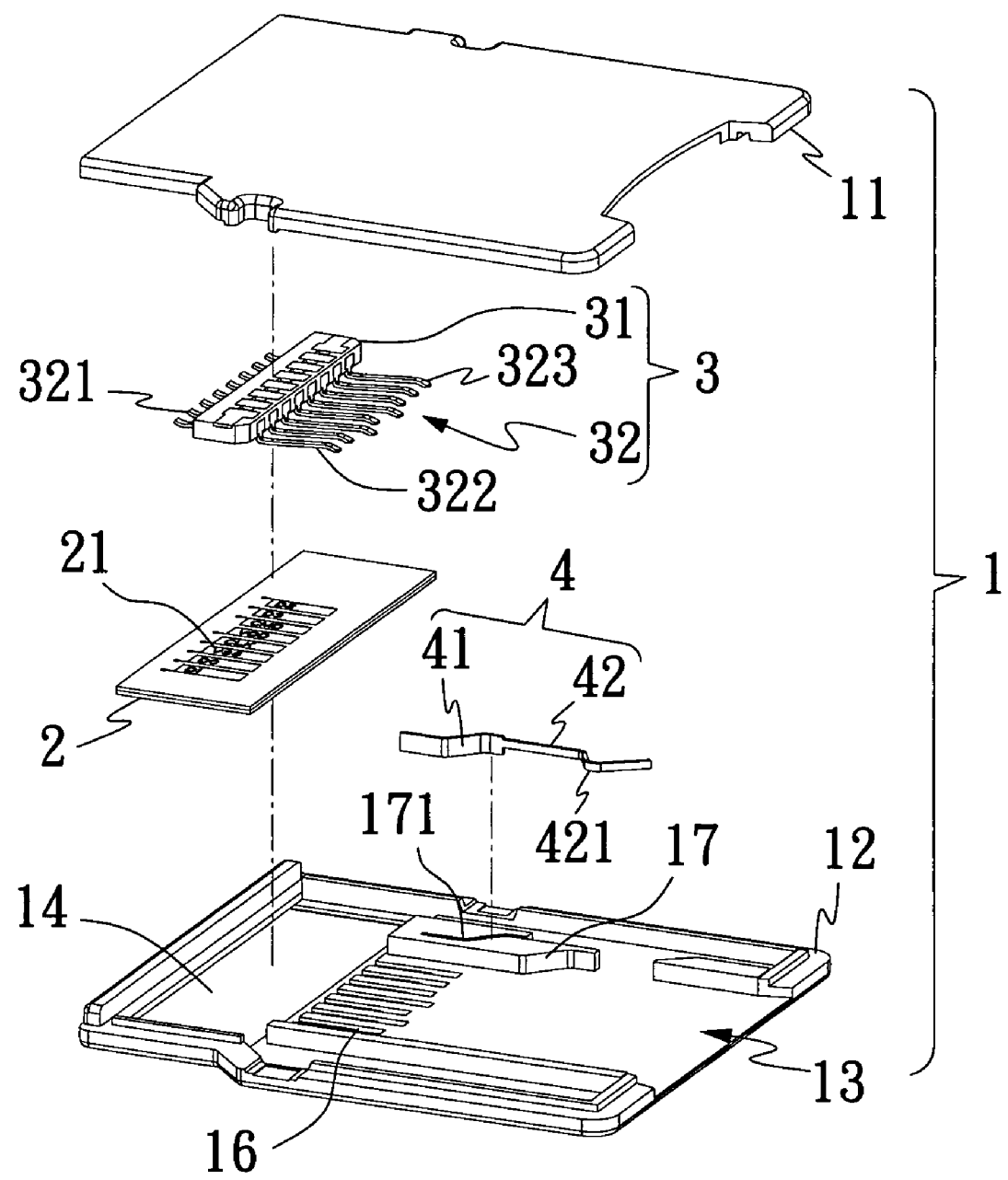
FIG. 3 is an exploded view of a micro SD adapter of the present invention.
Figure 4:
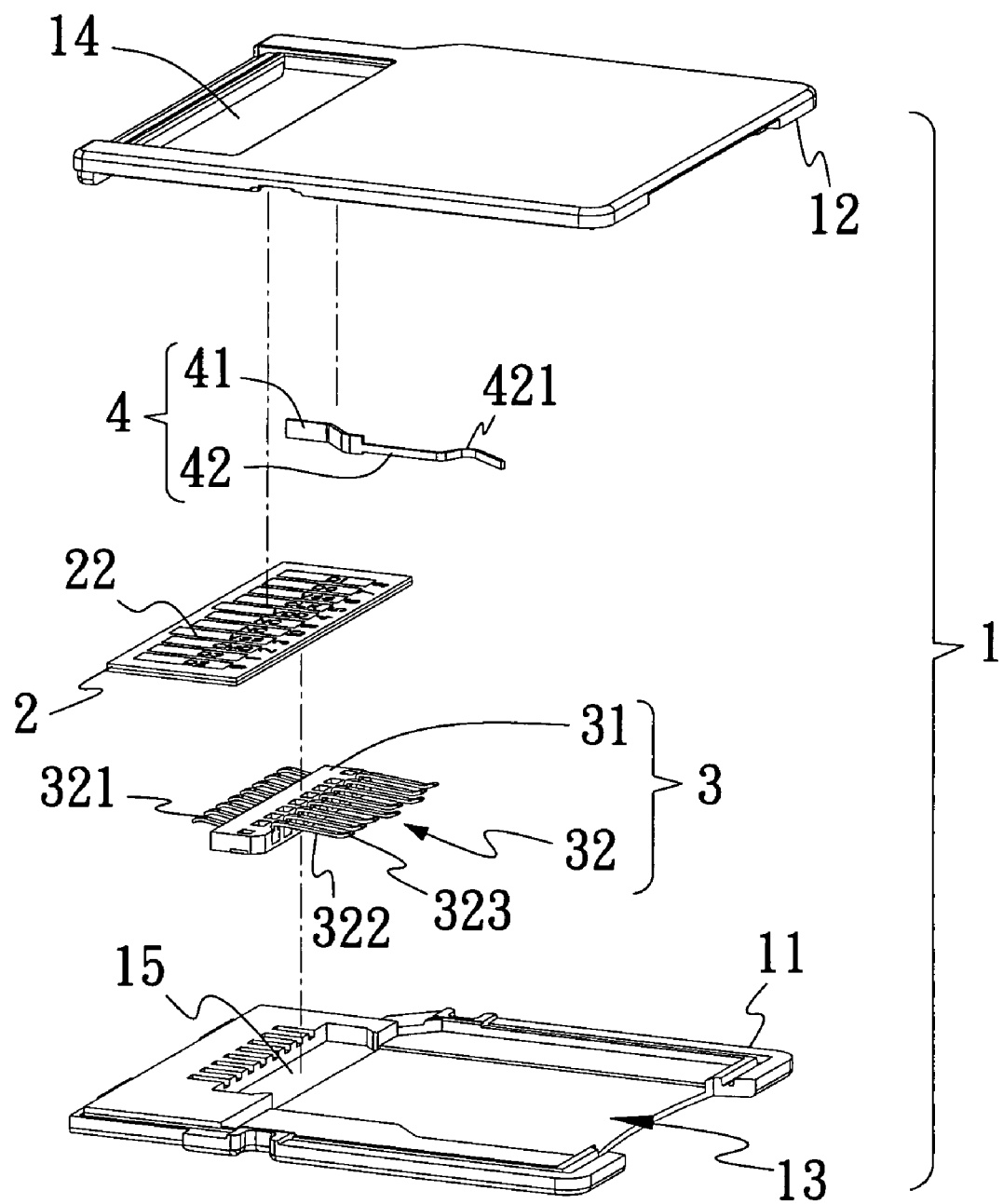
FIG. 4 is another exploded view of a micro SD adapter of the present invention.
Figure 5:
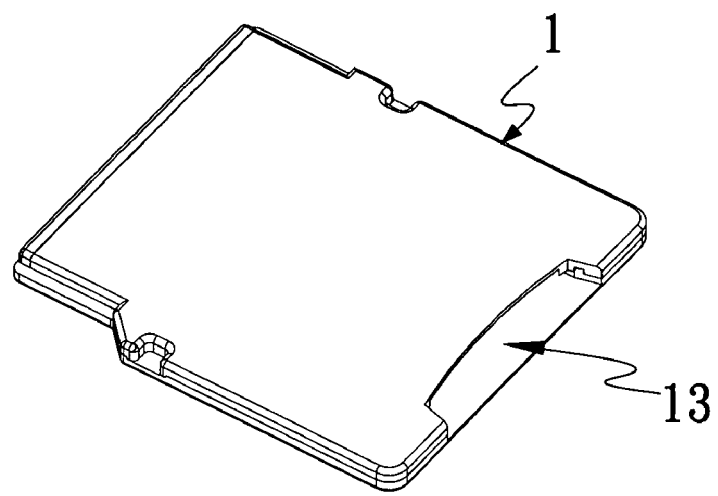
FIG. 5 is a perspective view of a micro SD adapter of the present invention.

Referring to FIGS. 3, 4 and 5 for the perspective view, the exploded view, and the exploded view at another viewing angle of the present invention, a micro SD adapter structure of the invention comprises a casing 1, a transmitting unit 2 and a terminal module 3 and a latch unit 4, such that the micro SD card 5 can be installed securely into a casing 1 and will not be loosened or fallen out easily, so as to achieve a better electric transmitting effect. The invention also can swap the micro SD card 5 immediately when the micro SD card 5 is inserted into the casing 1 of the micro SD adapter.

The casing 1 comprises an upper casing 11 and a lower casing 12 engaged with each other by ultrasonic waves to form a hollow structure in the shape of a mini SD card, an insert slot 13 disposed at a distal edge of the casing 1 and interconnected with the interior of the casing 1, a hollow portion 14 disposed on a surface of the lower casing 12 of the casing 1, an embedding grooves 15 disposed on the upper casing 11 of the casing 1 and corresponding to a surface of the hollow portion 14, a plurality of sunken grooves 16 disposed on a distal surface of the insert slot 13 at a lateral side of the hollow portion 14, a connecting base 17 disposed proximate to a lateral side of each sunken groove 16, and a cut groove 171 disposed on the connecting base 17.

The transmitting interface 2 includes a plurality of contact portions 21, 22 electrically connected and disposed on both surfaces of transmitting interface 2 and installed on the hollow portion 14.

The terminal module 3 is electrically coupled to the transmitting interface 2 and has a fixing base 31 disposed in the embedding groove 15 of the casing 1, and the fixing base 31 includes a plurality of terminals 32, and an end of each terminal 32 has a first connecting portion 321 electrically coupled to each contact portion 21, 22 on a surface of the transmitting interface 2 and another end of each terminal 32 has a second connecting portion 322 corresponding to a plurality of sunken grooves 16 of the casing 1, and each terminal 32 has a slanting surface 323 disposed at a distal surface of each terminal 32 corresponding to the sunken groove 16.

The latch unit 4 installed in the embedding groove 171 of the connecting base 17 includes a coupling portion 41 and a bracket 42 coupled to the coupling portion 41 and having a curved portion 421, so that the aforementioned structure constitutes a novel improved micro SD adapter structure.

Figure 6:
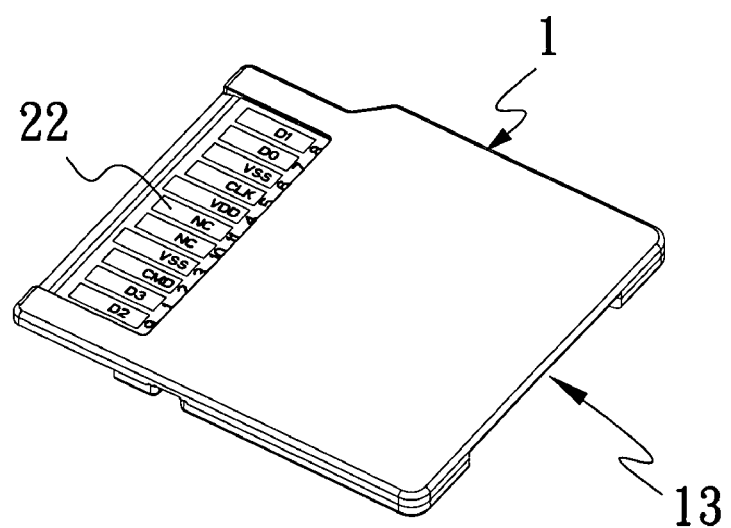
FIG. 6 is another perspective view of a micro SD adapter of the present invention.
Figure 7:
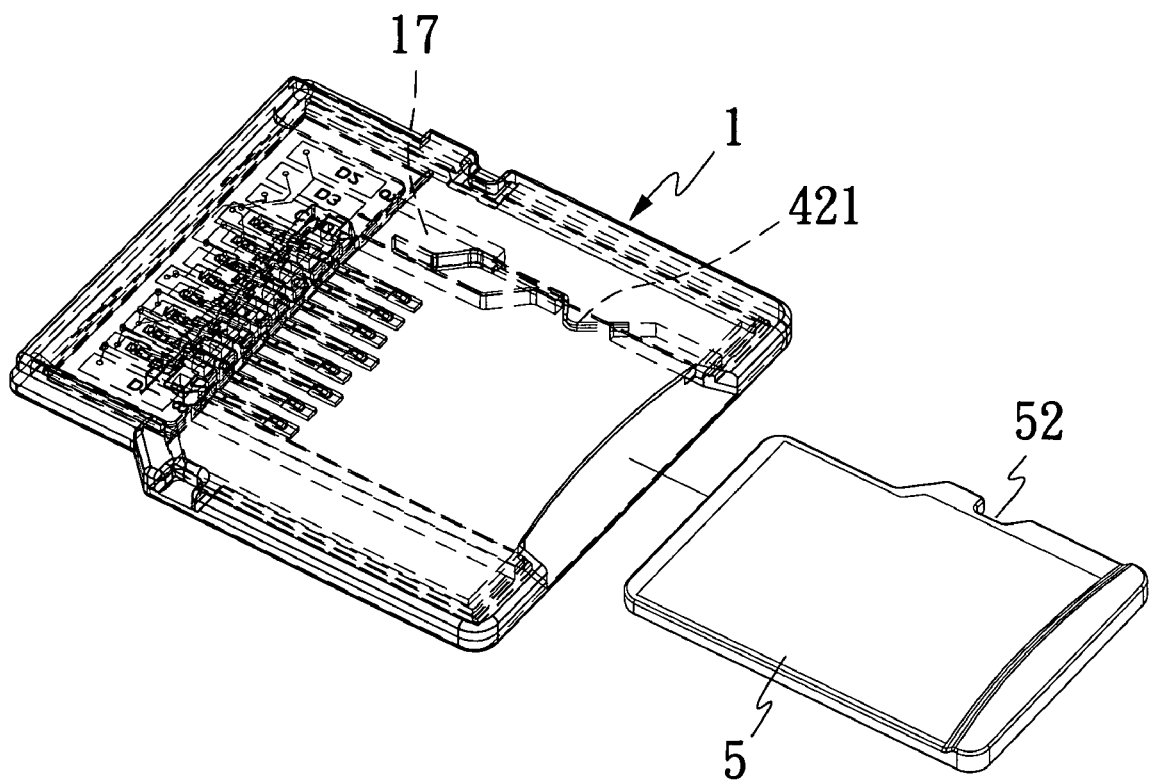
FIG. 7 is a schematic view of inserting a micro SD card into a micro SD adapter according to the present invention.
Figure 8:
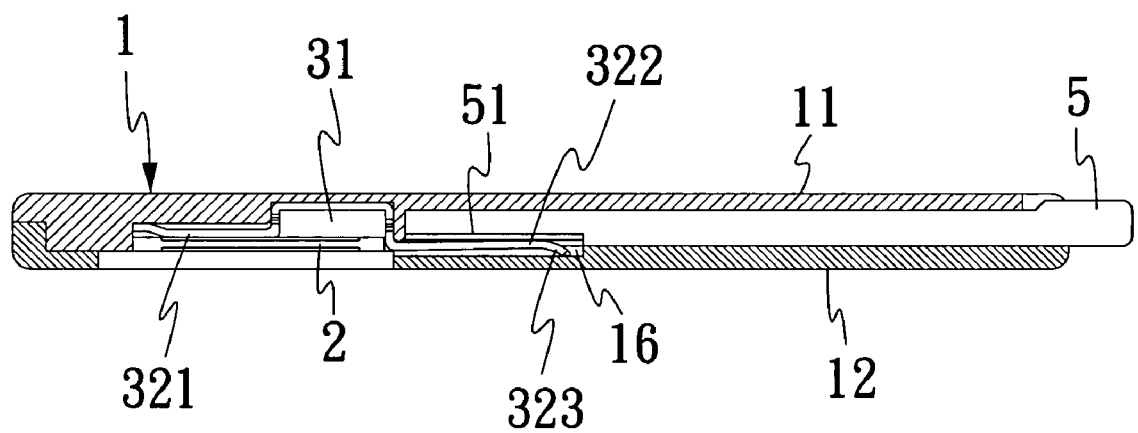
FIG. 8 is a cross-sectional view of a micro SD adapter inserted with a micro SD card according to the present invention.
Figure 9:
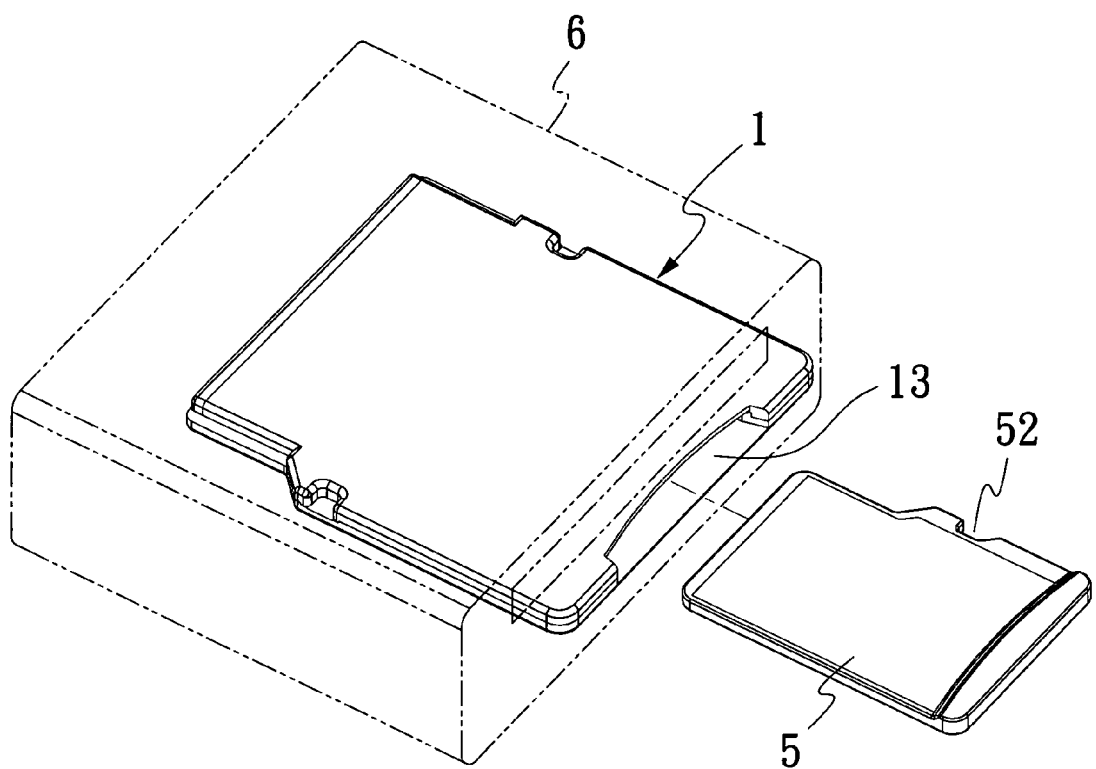
FIG. 9 is a cross-sectional view of a micro SD adapter inserted into a card reader according to the present invention.

Referring to FIGS. 6, 7 and 8 for the schematic view of inserting a micro SD card into a micro SD adapter according to the present invention and the schematic view and the cross-sectional view of a micro SD adapter inserted with a micro SD card according to the present invention respectively, the invention inserts the casing 1 into a card reader 6 of an electronic equipment (not shown in the figure) or (connects with the micro SD card 5 first and then the card reader 6), and the micro SD card 5 is inserted into the insert slot 13 of the casing 1, such that a distal edge of the micro SD card 5 is pushed to the slanting surface 323 of the terminal 32 on the terminal module 3 to compress the terminals 32 towards the sunken groove 16 of the lower casing 12, and then the resilience of the terminal 32 presses and contacts the goldfinger 51 at the bottom surface of the micro SD card 5. In the meantime, a lateral edge of the micro SD card 5 pushes the bracket 42 of the latch unit 4. After the micro SD card 5 is inserted completely into the insert slot 13, the resilience of the bracket 42 latches the curved portion 421 into a concave opening 52 at a lateral side of the micro SD card 5, such that the micro SD card 5 can be installed securely into the insert slot 13 of the casing 1 and will not loosened or fallen out easily, so as to achieve a better electric transmitting effect. Since the opening of the insert slot 13 is disposed at a rear distal edge of the casing 1, therefore users only need to take the micro SD card 5 directly out from the insert slot 13 of the casing 1 without the need of taking out the card reader 6 from the casing 1 in order to swap the micro SD card 5.

In summation of the description above, the micro SD adapter structure of the present invention effectively overcomes the shortcomings of the prior art and securely installs a micro SD card into an insert slot of a casing by a plurality of terminals installed in the sunken groove of the casing and a latch unit, and the micro SD card will not loosened or fallen out, so as to achieve a better electric transmitting effect, and herein enhances the performance over the conventional structure and complies with the patent application requirements.

What is claimed is:

1. A micro SD adapter structure, comprising:
   a casing, including an insert slot disposed at a distal edge of said casing and interconnected with the interior of said casing receiving a micro SD card, a hollow portion disposed on a surface of said casing at an end opposite said insert slot, an embedding groove disposed at said casing and corresponding to a surface of said hollow portion, a plurality of sunken grooves disposed on a distal surface of said insert slot at a lateral side of said hollow portion, and a connecting base disposed proximate to a lateral side of said each sunken groove;
   a transmitting interface, including a plurality of contact portions disposed separately on both surface of said transmitting interface and installed on said hollow portion,
   a terminal module mounted above said transmitting interface, electrically coupled to said transmitting interface and having a fixing base disposed in said embedding groove of said casing, and said fixing base including a plurality of terminals, and an end of said each terminal being electrically coupled to one of said plurality of contact portions on a surface of said transmitting interface and another end corresponding to said plurality of sunken grooves; and
   a latch unit, installed on said connecting base latching said micro SD card in a secured position to achieve a better electric transmitting effect.

2. The micro SD adapter structure of claim 1, wherein said casing comprises an upper casing and a lower casing engaged with each other by ultrasonic waves.

3. The micro SD adapter structure of claim 1, wherein said connecting base includes a cut groove.

4. The micro SD adapter structure of claim 1, wherein said latch unit comprises a coupling portion and a bracket coupled with said coupling portion and having a curved portion.

5. The micro SD adapter structure of claim 1, wherein said each terminal comprises a first connecting portion electrically coupled to a transmitting interface by an end of said each terminal and a second connecting portion corresponding to said plurality of sunken grooves.

6. The micro SD adapter structure of claim 5, wherein said second connecting portion of said each terminal includes a slanting surface.

* * * * *